Sept. 23, 1969     I. R. HIGGINS     3,468,707

HYDROLYZER PROCESS FOR STEEL PICKLING LIQUORS

Filed April 4, 1966     4 Sheets-Sheet 1

INVENTOR
IRWIN R. HIGGINS

BY Cushman, Darby & Cushman
ATTORNEYS

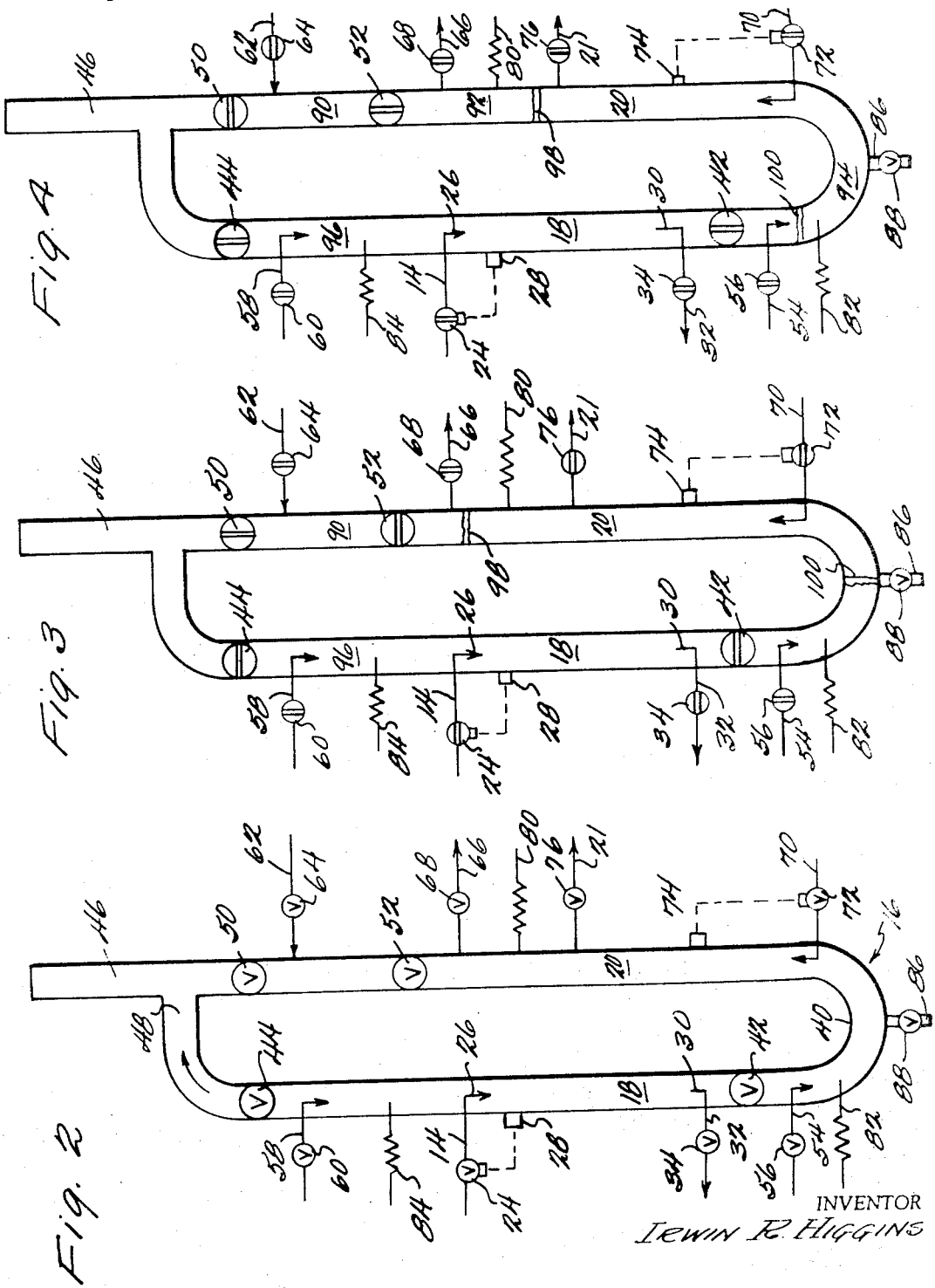

Sept. 23, 1969  I. R. HIGGINS  3,468,707
HYDROLYZER PROCESS FOR STEEL PICKLING LIQUORS
Filed April 4, 1966  4 Sheets-Sheet 3

INVENTOR
IRWIN R. HIGGINS

BY
Cushman, Darby & Cushman
ATTORNEYS

Patented Sept. 23, 1969

3,468,707
HYDROLYZER PROCESS FOR STEEL
PICKLING LIQUORS
Irwin R. Higgins, Oak Ridge, Tenn., assignor to Chemical Separations Corporation, Oak Ridge, Tenn., a corporation of Tennessee
Filed Apr. 4, 1966, Ser. No. 540,058
Int. Cl. B08b 3/10
U.S. Cl. 134—3                                                7 Claims

ABSTRACT OF THE DISCLOSURE

A continuous cylic process for the pickling of metal, for regenerating spent pickle liquor and for regenerating an agent employed to regenerate said spent pickle liquor which comprises conducting the pickling operation with a pickle liquor having an acid concentration maintained within the range of about 5 to 20 weight percent and a metal salt of said acid concentration maintained within the range of about 1 to 10 weight percent, continuously withdrawing spent pickle liquor from the pickling step for regeneration, said regeneration comprising flowing said spent pickle liquor through a first section of an ion exchange column loop having a shiftable ion exchange resin bed therein, to bring the same into contact with a first portion of ion exchange resin therein and exchanging metal ions from the spent pickle liquor for ions of the exchange resin; while withdrawing from said first section regenerated pickle liquor adapted for continuous recirculation to said pickling step; continuously recirculating said regenerated pickle liquor to said pickling step; simultaneously treating a second portion of said ion exchange resin which is loaded with metal ions exchanged in the regeneration of the spent pickle liquor, with a regenerating agent in a second section of said column loop; substantially simultaneously interrupting the flow of said spent pickle liquor and said regenerating agent; shifting the ion exchange resin bed in said ion exchange column loop from one section thereof to another contiguous section therein; thereby replacing at least a portion of said resin in said first section with another portion of said resin previously regenerated in said second section and displacing a portion of resin carrying the metal ions previously eliminated from the spent pickle liquor into said second section for regeneration thereof; withdrawing from said second section a solution of metal salt of regenerating agent; hydrolyzing said solution to provide a mixture of metal oxide and regenerating agent; separating said metal oxide from said regenerating agent; continuously recycling the regenerated regenerating agent to said section of said column loop, and repeating the same cycle of steps as long as desired.

---

Figure 1:
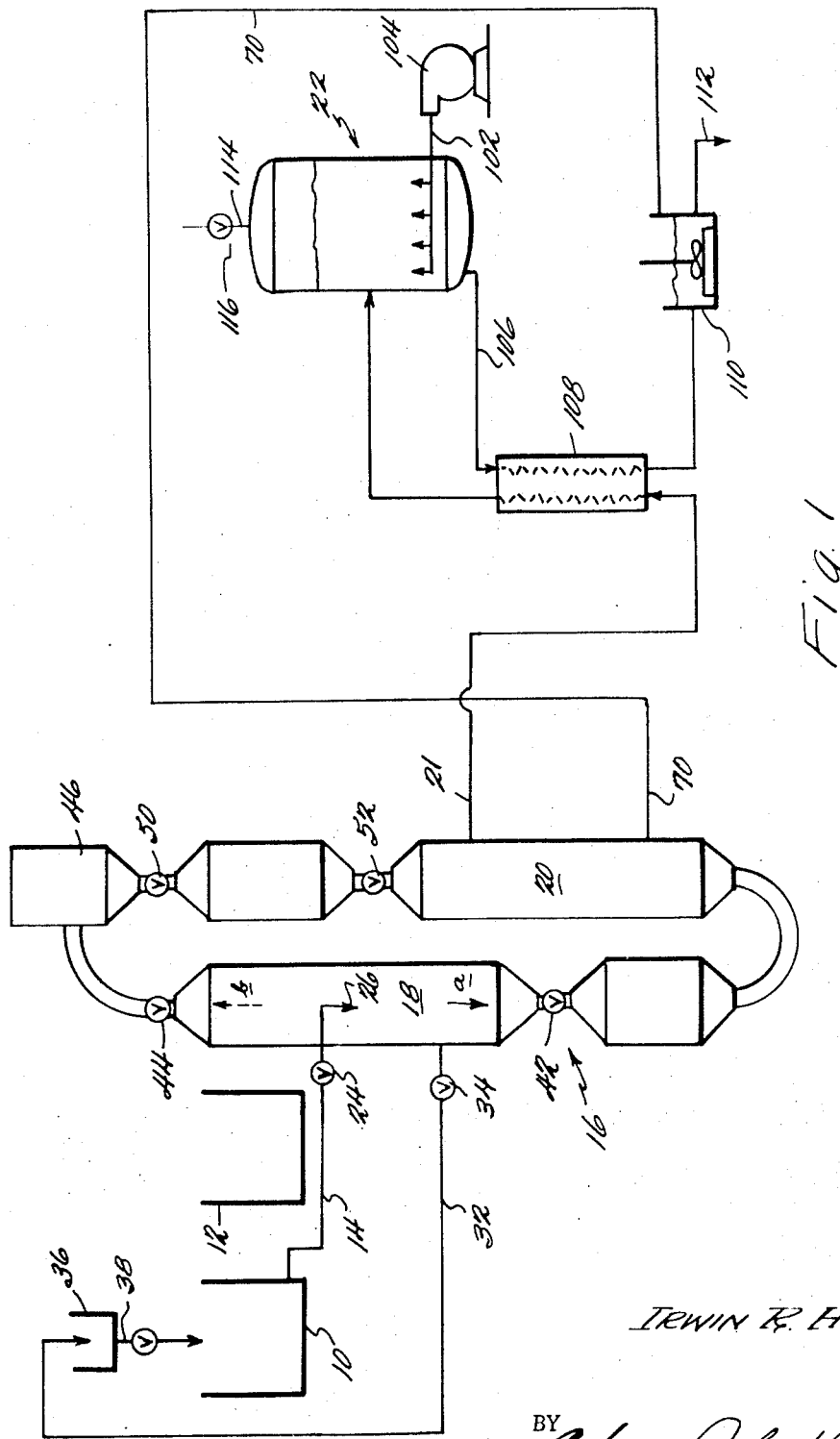

This invention relates to apparatus for and method of pickling metal and for regenerating spent pickle liquor for recycle to the pickling metal process.

In the processing of fabricated forms of metal such as sheets, strips, wire and the like a pickling step is employed to remove mill scale or metal oxide from the metal surface. There is conventionally employed for this purpose a relatively dilute solution of a suitable acid having a concentration ranging from about 5 to 20 percent acid. In the course of the pickling operation, metal oxide is dissolved by the acid with the formation, generally, of a metal salt. The concentration of the metal salt in the pickling bath eventually reaches a value where the pickle liquor ceases to function efficiently.

Further, it has been considered conventional practice to continue the pickling process for a time sufficient to reduce the free acid content of the spent pickle liquor to a point where disposal of the waste liquor does not involve too great an economic loss. When such practices are employed, however, a lack of uniformity of pickling of the metal has been encountered, In addition to economic considerations other serious problems associated with disposal of waste pickling liquor have been encountered by industry. The existence of municipal and State laws against stream pollution has emphasized to those industries which generate waste pickle liquor the desiratum for disposing of waste pickle liquor without polluting streams or the atmosphere.

Efforts to achieve such goals have developed several alternative disposal methods. For instance, it is known to neutralize the spent liquor with lime to form a precipitate. Such a method has certain disadvantages in that expenditures are required not only for the neutralization agent but also for the provision of dump sites and transportation costs thereto. Moreover, such methods do not guarantee that the dumped neutralized pickle liquor will not contaminate underground streams or wells, thus exposing the practioner to legal action.

Yet other efforts have been directed to treating the spent pickle liquor with a view to recovering a byproduct. Often such efforts have culminated in a process whereby crystallization procedures are employed, thus necessitating the provision of costly apparatus which significantly minimize the value or attractiveness of such processes from an economic viewpoint. Still other efforts resulted in practices whereby the spent pickle liquor undergoes evaporation techniques which require high heat input and large bulk handling equipment, often made of costly materials to withstand the highly corrosive nature of the material being processed. Ordinarily, the byproduct of such evaporation techniques includes a metal oxide or metal salt such as iron oxide or iron sulfate.

Further, efforts to achieve an overall efficient and economic process have, heretofore, resulted in certain methods whereby the spent pickle liquor is regenerated to produce the acid component of the pickle liquor suitable for recycle to the pickling bath as well as the production of a by-product. These methods, however, have generally been characterized as uneconomical and have not therefore been practiced commercially on any significant scale.

It is therefore a principal object of the present invention to provide a method of processing spent pickle liquor which overcomes the disadvantages of prior art methods.

Another object of the instant invention is to provide a novel apparatus and method for pickling metal and for regenerating spent pickle liquor.

Yet another object of the instant invention is to provide a novel apparatus and method which increase the efficiency of the pickling process.

A further object of the instant invention is to provide a novel apparatus and method for pickling metal and for regenerating the pickle liquor, by which regeneration, the liquor is highly suitable for recycle to the pickling process and for the production of a by-product of value and for the substantial elimination of waste disposal problems.

Yet a further object of the instant invention is to provide a novel apparatus and method for pickling metal which result in increased uniformity of pickling liquor concentration and substantial increase in control and uniformity of pickling of the metal.

Figure 6:
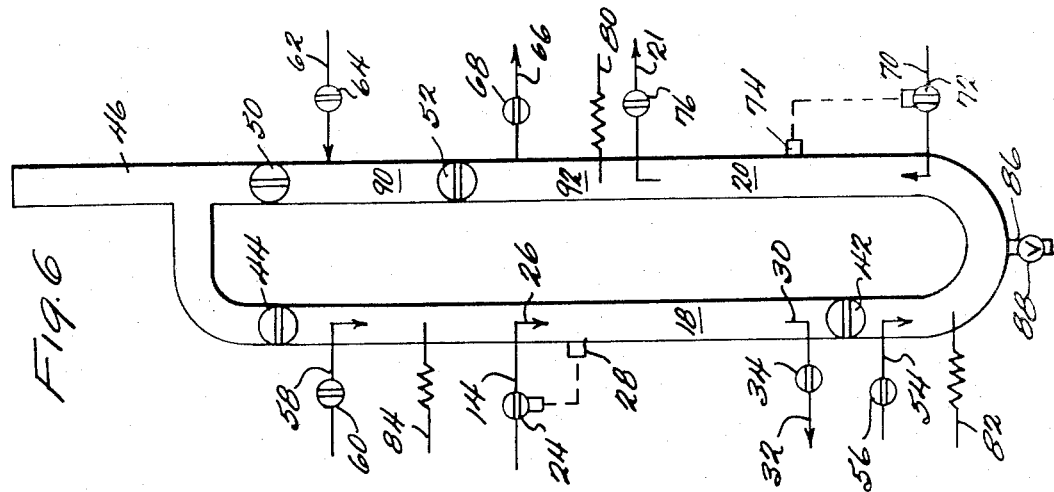
Figure 5:
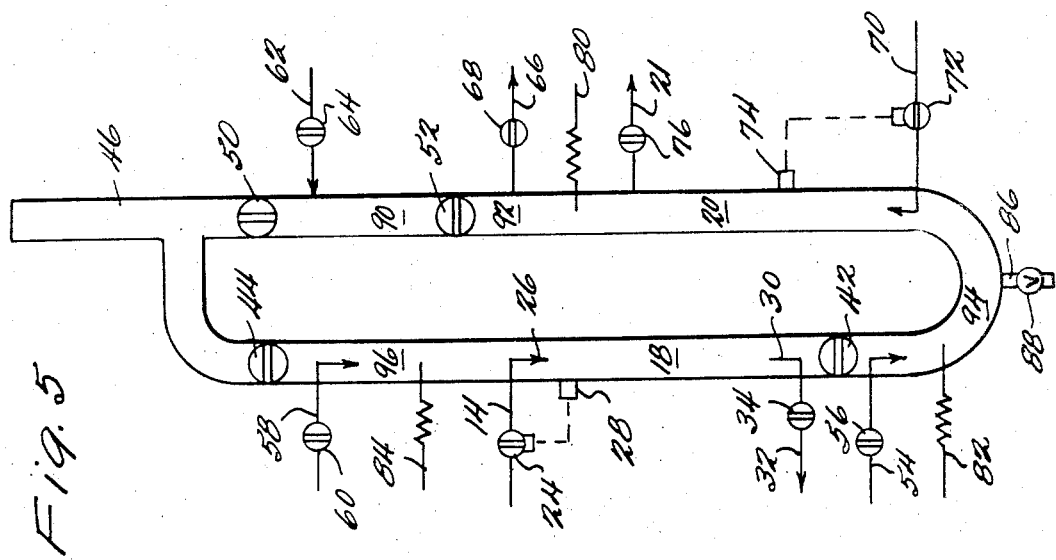
Figure 7:
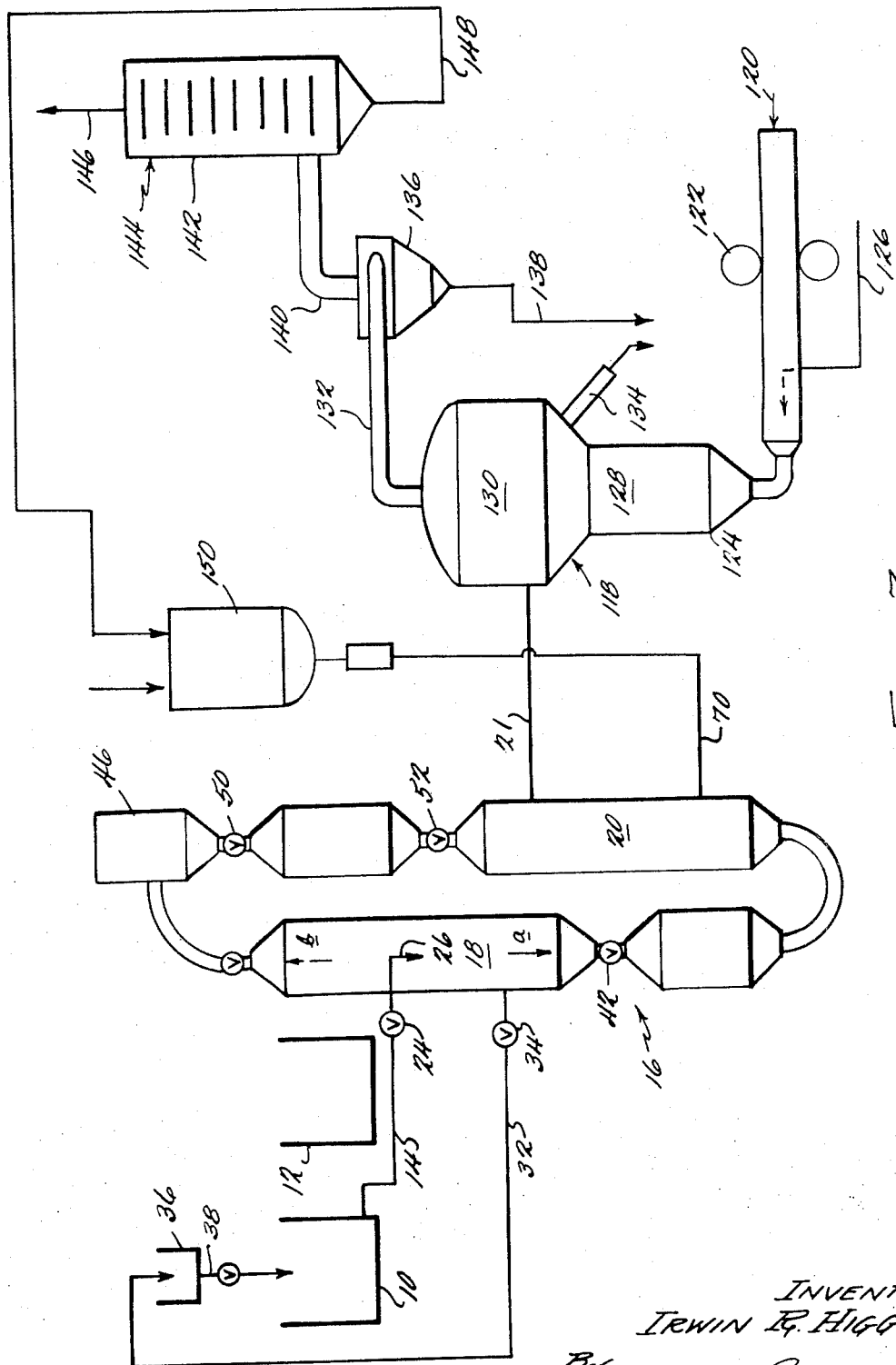

Other object and advantages will be apparent from the following description taken in connection with the accompanying drawings wherein;

FIGURE 1 is a flow sheet for an embodiment of the invention;

FIGURE 2 schematically illustrates an ion exchange column loop for regenerating a spent pickle liquor and for production of a metal salt of regenerating agent;

FIGURES 3, 4, 5 and 6 schematically illustrate the various stages of the operation of the ion exchange system of FIGURE 2; and FIGURE 7 is a flow sheet for another embodiment of the invention.

The present invention provides for a correlation between the acid content of the pickle liquor bath solution and the regenerated acid recycled to the pickle liquor bath solution so as to obtain an efficient rate of pickling which is substantially uniform for the metal being pickled. To this end, it has been found that maintaining the pickle liquor at an acid concentration of about 5 to 20 percent and metal salt concentration of about 1 to 10 percent then such uniformity of pickling of the metal is achieved.

In combination with a pickling system controlled as to pickle liquor bath solution composition the instant invention also provides regeneration apparatus to obtain from the spent liquor, acid suitable for recycle to the pickling liquor and an acid salt adaptable to provide a metal oxide of value as well as regenerating agent.

General description of apparatus and method

The apparatus shown diagrammatically in FIGURE 1 includes only the major elements thereof and particularly illustrates the relationship of the regenerated pickle liquor bath solution acid to the pickling process as well as the relationship between a regenerated regenerating agent to the pickle liquor regenerating process. In this figure there is shown one pickle tank, indicated at 10, although it should be realized that a plurality of such tanks can conveniently be employed and the contents thereof controlled according to the instant invention. The number of pickle tanks employed will depend on a number of factors, one of which is the form of the metal to be pickled as it comes from the mill. For instance, steel which comes from the mill as strip steel generally is processed in about four pickle tanks. The strip steel usually is in rolls or coils although such coils are unrolled and the strip is passed continuously through the series of four pickle tanks. The rear end of each strip ordinarily is connected to the lead end of the next strip by such means as a seam weld which subsequently can be easily disposed of, if desired, by cutting out the seam after the pickling is completed.

The steel, after pickling, is led by any convenient means to a rinse zone comprising at least one rinse tank 12. Although again, it should be recognized that while only one such rinse tank is shown, generally, a plurality of rinse tanks can advantageously be employed. From the pickle tank 10, spent pickle liquor is withdrawn and conducted via line 14 to the regenerative part of the apparatus.

As illustrated in the drawing, the regenerative part of the apparatus of this invention comprises a continuous ion exchange column loop system 14 having two operating ion exchange sections, i.e., a leading section 18 and a stripping section 20. The direction of liquid flow is indicated by the solid arrows $a$ and the direction of resin flow is indicated by the open arrows $b$. It will be noted that the solution generally flows countercurrent to the movement of the resin. An apparatus which can be used in the regenerative portion of the instant invention is disclosed in U.S. Patent 2,815,322 issued Dec. 3, 1957, to the present inventor.

Referring again to FIGURE 1, the approach of regeneration procedure of the instant invention will be seen with reference to the chemicals noted thereon. It should, of course, be recognized that the particular chemicals identified are representative only, as a number of such chemicals can be used, depending on such factors as the particular pickle liquor originally employed, the particular metal being pickled, the choice of the regenerating agent, etc. Thus, a spent pickle liquor containing a metal ion and a pickle liquor acid anion enters through pipe 14 into the loading section 18. This loading section contains a strong acid type cation exchange resin in the acid form, and as the spent pickle liquor flows there-through, the hydrogen ions are exchanged into solution and the metal ions are absorbed on the resin. Thus a solution of pickle liquor acid is taken off from the loading section and advantageously recycled to the pickling zone where it can be introduced into the pickling tank 10 at a rate substantially equal to the rate at which it is depleted and withdrawn via line 14, thus substantially controlling the composition of the pickle liquor in tank 10 at a level at which optimum pickling procedures are achieved.

The metal ion rich resin now in the loading section 18 is shifted to the stripping section 20. In stripping section 20, a regenerating acid solution is passed through the resin, and metal ions are exchanged into solution with absorption of hydrogen ions. Thus, the solution removed from the stripping section 20 is a metal salt of the regenerating acid solution.

It will be appreciated that in order to practice this portion of the overall process, certain conditions must exist and be controlled. It is important to control the aqueous composition in various parts of the loop so that the spent pickle liquor solution is confined essentially to the loading section and the regenerating solution is confined essentially to the stripping section. Means can also be provided to shift the resin bed no more and no less than a certain amount in order that proper and efficient exchange will take place. Further, the volume, flow rate and concentration of the chemical solutions must be balanced so that the metal salt solution leaving the stripping section is not excessively acid although excess acid should be present and that the metal values are, nevertheless, effectively removed from the spent pickle liquor.

The metal salt solution removed from the stripping section 20 is led via line 21 to a hydrolyzer 22 wherein the metal salt solution is hydrolyzed to produce under pressure regenerating agent and metal oxide, the regenerating agent being suitable for recycle to the spent pickle liquor regenerating portion of the apparatus, i.e., the continuous column loop system.

Description of apparatus and method of the pickling unit

As stated before, any number of pickling tanks 10 can be employed depending on the particular metal to be pickled, the extent of pickling required, i.e., the quantity of mill scale to be removed and the form of the metal being pickeled. Generally, the pickling tank is fabricated or treated with material sufficiently inert to the pickel liquor contained therein. Usually the pickle liquor is made up by first filling the tank with pre-heated industrial water. When the water reaches near the working level of the bath, acid is added in a predetermined amount necessary to make a concentration of about 5 to 20 percent acid by weight. Ordinarily, acid additions are made by opening valve means (not shown) on the acid feed line to the tank. The valve means can, preferably, be automatically controlled by, for instance, a flowmeter-indicator apparatus and on completion of delivery to the tank of a predetermined amount, the valve means can be closed. It has been found advantageous to employ conventional inhibitors in the pickling baths and generally the addition is made with make-up acid or independently to the pickle tank.

The pickling bath during the pickling operation can be automatically titrated at predetermined intervals, the results of titration automatically controlling (1) the addition of make-up acid to the bath and (2) the removal of spent pickle liquor in amounts to maintain the pickling bath composition essentially constant. The advantaeous result of this mode of operation is that it obviates prior art practices which required working the bath to an extremely low acid concentration, say about 1% while the acid salt concentration became excessively high in order to facilitate disposal of the waste pickle liquor. Such operations produced nonuniform pickling results.

Ordinarily, pickling time in the pickling bath will vary widely depending on a number of easily ascertainable factors such as the type of metal being pickled, the particular pickle bath chosen, etc.

The type of pickle acid employed in making up the pickle bath will also depend on a number of factors such as the extent of pickling desired, the type of metal being pickled. Many acids are suitably employed with the instant invention and representative of such acids are sulfuric, phosphoric and hydrochloric as well as organic acids such as citric. It has been found that acids having a pKa ranging from $10^{-4}$ to 1 are advantageously employed with the instant invention. The temperature of the bath conveniently can range from ambient temperature to as high as 100° C. Higher temperatures can be employed but ordinarily when so used, pressures sufficient to keep the pickling bath in liquid form are required which unnecessarily adds to the expense of the operation.

After pickling the metal for a time sufficient to remove the mill scale, the metal is withdrawn from the pickle tank 10 by any convenient means and introduced into a rinse tank 12. Any number of such tanks can be employed and are generally lined with acid resistant brick liners. The tank can be filled with industrial water and is provided with an outlet line (not shown) leading, for instance, to a sewer or other disposal site.

When the pickling bath reaches a predetermined composition with respect to the acid and metal salt content thereof, spent pickle liquor can be withdrawn at a rate substantially comparable to the rate of introduction of regenerated pickle acid and industrial water to maintain the pickle bath solution substantially constant.

Description of the apparatus and method of the regeneration unit

As shown best in FIGURE 2, spent pickle liquor enters ion exchange column 16 through valve 24 via pipe 14 and distributing means 26. Valve 24, preferably, is automatically controlled by a metal-hydrogen detector 28 located adjacent the loading section 18 of the column. Distributing means 26 is located at the upper end of loading section 18 thereof. The spent pickle liquor passes downwardly through the cation exchange resin which completely fills section 18 and on which is absorbed the metal value thereof. Regenerated pickle bath solution acid passes out of this section through collecting means 30 and pipe 32 provided with valve 34 which leads to a hold tank 36. Hold tank 36 can be provided with an outlet 38 adaptable to be in communication with the pickling tank 10 so that on withdrawal of spent liquor from the latter regenerated pickle bath solution, acid from the holding tank can be introduced therein. If necessary concentrated pickling acid can be introduced into the holding tank 36 to compensate for any dilution of the regenerated pickling acid.

The continuous ion exchange column 16 includes the loading section 18 which is arranged to permit upward flow of the resin therein and stripping section 20 arranged for downward flow of the resin therein. It should be recognized however that these flows are only relative and can of course be reversed, the importance of the arrangement residing in the fact that the flow of resin to solution is countercurrent.

Resin-circulating conduit 40 extends downwardly from stripping section 20 and then extends vertically alongside and to a level above the loading section 18 and is provided with resin valves 42 and 44 which control the flow of the resin in the loading portion of the column. Conduit 40 then opens into the upper resin reservoir 46 at orifice 48. Reservoir 46 is also provided with two resin valves 50 and 52 which serve to control the flow of the resin.

As shown, reservoir 46 extends above communicating orifice 48 and is provided with means to permit overflow of waste wash water and resin fines into a disposal or resin fines recovery unit (not shown).

Resin-circulating conduit 40 is also provided with water line 54 controlled by valve 56 and adapted to deliver water from a source (not shown) therein. As shown, water pipe 54 enters the column at a point below resin valve 42. A second water pipe 58, leading from a source (not shown) and controlled by valve 60 is arranged to enter loading section 18 just below resin valve 44.

Resin return conduit 46 is also provided with water lines for delivery and removal of wash water. Pipe 62 controlled by valve 64 is provided for delivery of water from a source (not shown) into conduit 46 at a point below resin valve 50. Conduit 46 is also provided with water outlet line 66 controlled by valve 68 for removal of waste wash water at a point between resin valve 52 and stripping section 20.

Stripping section 20 is provided with line 70 controlled by valve 72, which in turn is also responsive to a metal-hydrogen detector 74 for introducing stripping or resin regenerating agent into this section. The flow of stripping agent is upwardly or countercurrent to the downwardly flowing metal ion containing resin. Regenerating acid metal salt outlet 21, controlled by valve 76, is located adjacent the upper end of the stripping section 20 and below the conductivity probe 80.

As a further and important feature of this invention, means are provided for substantially automatically controlling the operation of these various valves in the wash water and loading section lines in such a manner as to insure that the resin regenerating agent is not contaminated or adulterated with either the wash water or the spent pickle liquor. These control means comprise a conductivity probe 80 in the resin-circulating conduit 46 arranged between water outlet pipe 66 and stripping section 20 of the resin exchange column 16. A second conductivity probe 82 in resin-circulating pipe 40 is arranged at a point below water pipe 54. A third conductivity probe 84 can be arranged in pipe 40 between spent pickle liquor inlet pipe 14 and wash water pipe 58. These conductivity probes are responsive to changes in the conductivity of the solution in the ion exchange column 16 at their respective locations, and through an appropriate servo-mechanism actuate the respective line valves in response to such changes in conductivity measurements, as will be described more fully hereinafter.

The ion exchange resin column 16 can also be provided with drain pipe 86 controlled by valve 88 in the event draining and removal of the entire column is desired for cleaning or other purposes.

The following description of the operation of column 16 is made in connection with FIGURES 3 to 6 which are adapted for schematic illustration of the positioning of the various valves involved in the operation, to facilitate a better understanding of the same.

Referring first to FIGURES 3-6, which illustrate the condition of ion exchange column 16 during the loading and stripping cycle when resin regenerating agent is flowing upwardly through stripping section 20, and a separate portion of the ion exchange resin is being loaded with metal ions from the spent pickle liquor in loading section 18. As seen in FIGURE 3, during this cycle resin valves 42, 44 and 52 are closed and resin valve 50 is open. Valves 72 and 76 in pipes 70 and 21, respectively, are opened, permitting regenerating acid flow through and regenerating acid metal salt removal from stripping section 20. Valves 24 and 34 in spent pickle liquor charge line 14 and pickling acid discharge line 32, respectively, are opened, permitting downward flow of the spent pickle liquor through loading section 18. Valves 56 (line 54), 60 (line 58), 64 (line 62) and 68 (line 66) may be open or closed depending on conductivity signal.

After a predetermined time of passage of resin regenerating agent through the stripping section 20, and in accordance with the principles described and claimed in U.S. Patent 2,815,322, the column 16 is operated so as to shift and replace the ion exchange resin bed contained therein by introducing a fresh portion of metal ion loaded resin.

To effect this procedure, resin valve 50, regenerating acid valve 72, metal salt valve 76, spent pickle liquor valve 24 and regenerated pickling acid valve 34 are all closed. Resin valves 42, 44 and 52 as well as valve 64 in hydraulic water supply line 62 are all opened, introducing a hydraulic thrust therethrough line 62 at the top of lower resin reservoir 90. Valve 68 in line 66 remains closed to prevent any water outlet flow at that point. The condition of the valves during this cycle is shown in FIGURE 4.

The hydraulic thrust is applied in section 90. The resin in the reservoir is pushed around the loop, water and resin are pushed into water elimination section 92, regenerating acid and resin are pushed into stripping section rinse section 94, water is pushed into loading section 18, spent pickle liquor is pushed into loading section rinse section 96 and water and resin are pushed into upper resin reservoir 46. As shown in FIGURE 4, the regenerating agent/water interfaces 98 and 100 have also been moved about the loop along with the resin.

In the next step, valve 64 in hydraulic water supply line 62 is closed, resin valves 42, 44 and 52 are closed and resin valve 50 is open. The resin that had been pushed into upper reservoir section 46 drops into lower reservoir section 90. Valve 72 in regenerating acid line 70 is now opened along with valve 68 in line 66. As regenerating acid flows into stripping section 20, the regenerating acid/water interface travels upward into water elimination section 92. Conductivity probe 80 in section 92 senses the lower conductivity of water and prevents regenerating agent from being transferred out of the column through line 21 by maintaining valve 76 closed (see FIGURE 5). When regenerating agent hits the conductivity probe 80 in section 92, this closes valve 68, stopping the outlet of water through line 66 and valve 76 is opened to allow metal salt to leave the column through line 21.

Regenerating agent will also have surrounded conductivity probe 82 in said rinse section 94 which senses the increased conductivity and signals water to enter section 94 through line 54 by opening valve 56. Valve 56 is closed and the water flow ceases when the conductivity indicates that water is contacting the conductivity probe 82. In similar manner, the conducting metal ion loaded solution in section 96 is rinsed out with water admitted through line 58 and conductivity probe 84 indicates when the water/loading solution interface has passed below it. This conductivity control of water flow in the column loop prevents dilution or loss of regenerating agent not going through the ion exchange column loop, and also prevents dilution of the spent pickle liquor.

In the next step, valve 64 in hydraulic water supply line 62 remains closed, resin valves 42, 44 and 52 are closed, resin valve 50 is opened, and the metal loaded resin that had passed into section 46 drops into the lower reservoir section 90. Valve 56 in water supply line 54 is opened, along with valve 68 in water outlet line 66. The conductivity probe 80 in section 92 senses the low conductivity of water and prevents regenerating agent from being transferred out of the column but allows it to be pushed counterclockwise and up through section 92 to displace water that came in with the resin, water being admitted through line 54 for this purpose (see FIGURE 6).

Valve 60 is now closed and valve 24 opened for cycling spent pickle liquor through the loading section 18, the same being introduced through line 14 with regenerated pickling acid being withdrawn through line 32. After expiration of the established loading period, the resin movement cycle is thereafter repeated through the steps just described in connection with FIGURES 3, 4, 5 and 6.

An advantageous feature of the regenerating apparatus of this invention lies in the use of conductivity probes 80, 82 and 84 to detect the position of the various interfaces between different liquids in the column and prevent dilution or loss of metal salt and regenerating agent and also prevents dilution of the spent pickle liquor. While there is a certain disturbance of ion exchange resin in the column during its intermittent movement from one place to another, it has been found that the metal salt and regenerating agent/water interfaces form a definite boundary between the solutions. Because of this phenomenon, it has been possible to maintain safeguards to prevent adulteration of the metal salt or regenerating agent by inadvertent admixture thereof with water or the spent pickle liquor.

It will also be understood that it is a preferable feature of this invention to arrange automatic valve cycling in response to the basic time schedule and the sensing response of the respective conductivity probes. Thus, conductivity probe 80 can be rranged with suitable solenoid valves 68 and 76 so that valve 76 will remain closed and valve 68 will remain open until the metal salt interface is above probe 80. But should the interface fall below probe 80, valve 76 is automatically closed and valve 68 is automatically opened.

During the cycling operation of the resin, as just described, it will be understood that the introduction of the rinse and pulse water into the column is accommodated through the overflow means delivery conduit 46. Some resin fines may be carried with this water overflow and to permit recovery of the same a settling tank (not shown) can be provided.

Attrition of the resin during the operation is made up through supply of additional resin, as required from a reservoir (not shown) in communication with delivery conduit.

Description of the hydrolyzer unit and its operation

The metal salt solution leaving line 21 of the ion exchange column 16 is conducted to hydrolyzer 22 wherein the salt solution is converted to acid regenerant and metal oxide under elevated pressure and temperature. Preferably, the hydrolyzer is fabricated from an acid-resistant material such as titanium but it will be recognized that other materials can be employed as long as they are essentially inert to the feed or reaction products under operating conditions.

In the hydrolyzer 22, the metal salt solution is converted to the acid regenerant and metal oxide by reaction with an oxygen containing gas introduced therein. Preferably, oxygen is introduced therein via conduit 102 leading from the discharge end of compressor 104. The reaction product of the hydrolyzer 22, i.e., the high temperature disproportionation product, acid regenerant and metal oxide are withdrawn from the hydrolyzer via conduit 106 and heat exchanged in heat exchanger 108 with the feed charge to the hydrolyzer in conduit 21.

The mixture of acid regenerant and substantially insoluble metal oxide are subsequently conducted to separation means 110, the acid regenerant being recycled to the stripping section 20 of the ion exchange resin column loop 16 via conduit 70, the metal oxide being withdrawn via discharge conduit 112. Any convenient separation means can be employed such as a thickener, centrifuge or the like. Generally, the choice of any particular separation means will depend on a number of factors easily ascertainable by those skilled in the art such as the output values desired, the particular regenerant being recovered, etc.

Hydrolyzer 22 can also be provided with relief line 114 controlled by valve 116 for removal of non-condensable gases produced in the hydrolyzer. The non-condensable gases comprise $NO$, $NO_2$, $O_2$ and $N_2$ and can be led to a scraubbing unit (not shown) if desired to recover additional resin regenerating acid which can be recycled to the regenerating unit 20.

Description of another embodiment of the invention utilizing a fluid bed to regenerate resin regenerating agent In another embodiment of the instant invention the metal salt solution leaving line 21 of the ion exchange column 16 can be processed to regenerate the resin regenerating agent introduced into the column via line 70 by a fluidized bed technique wherein the metal salt solution is decomposed to produce a metal oxide and vapors. The vapors, subsequently, are scrubbed with an aqueous medium to recover resin regenerating agent. Referring to FIGURE 6, the metal salt solution is conducted from the ion exchange column 16 to fluidized bed reactor 118 provided with fluidized solids such as coarse sand or alundum, having a particle size ranging, preferably, from about −6 to +20 mesh. Preferably, the fluidized bed reactor is fabricated from stainless steel but it will be recognized that any material inert to the feed or reaction products under operating conditions can be used.

Air is introduced to the reactor 118 via conduit 120 to fluidize the bed. Blower means 122 can be provided to transport the air to the bottom 124 of the reactor. Preferably, the air is preheated with an inert combustible gas, such as natural gas, fed to the air conduit 120 via conduit 126. The main fluidized bed section 128 expands, generally, to the freeboard section 130 which is provided with an outlet 132 for removal of vapors therefrom. Also in communication with the reactor is a solids outlet 134 for removal of the major amount of metal oxide produced in the reactor.

The vapors, removed from the reactor via line 132, are conducted, preferably, to a solids-gas separation means 136, which preferably can be a cyclone separator. The separator is provided with a solids discharge outlet 138 for removal of previously gas-entrained metal oxide. The vapors leave the cyclone separator 136 via conduit 140 and are conducted to a scrubbing unit 142 which can, conveniently, be of conventional design. The scrubbing tower 142 can be provided with a plurality of trays, such as the sieve type or bubble cap type or it can be a packed tower. The flow of vapors is countercurrent to the aqueous medium introduced to the scrub tower 142 via line 144. Waste gases are removed and exhausted to the atmosphere for instance, through line 146 while the resin regenerating agent formed in the scrub tower is removed via outlet 148 and recycled to the regenerating unit.

Conveniently, if desired, the regenerated resin regenerating agent can be conducted to a make-up tank 150 provided with an outlet in communication with inlet 70.

Discussion of specific embodiments of the invention

As one specific embodiment of the invention and with reference to FIGURE 1 of the drawings herein, this system can be conveniently operated using HCl in the pickling bath solution. Heretofore the use of hydrochloric acid has been quite limited because of its cost since prior methods failed to provide economical recovery systems of hydrochloric acid from the spent pickle liquor. The fact that the use of hydrochloric acid resulted in a better quality surface than when sulfuric acid was used was not sufficiently determinative to influence the industry to employ hydrochloric acid on a wide scale. It has been found that, advantageously, a spent pickle liquor containing about 1 percent excess or free hydrochloric acid can be present in the spent pickle liquor although higher percentages can be tolerated with concomitant reduction in the adsorption of iron on the resin. The pickle bath solution can be provided containing about 10 to 30 percent HCl as the pickling agent with or without conventional inhibitors. Employing such a pickling bath the instant invention is suitable for processing of 71,000 gallons per day of spent pickle liquor having a composition of 0.4 percent by weight HCl and 15 percent $FeCl_2$, specifically 1.18 to produce 23 tons per day of $Fe_2O_3$, and 1025 lb. moles aqueous nitric acid as regenerated pickling acid, i.e., HCl (20%).

Referring to the flow sheet, a quantity of 71,000 gallons per day of spent pickle liquor are removed from pickling tank 10 and introduced into the continuous ion exchange column loop 16 filled with a sulfonated polystyrene cation exchange resin, sold under the trade name of Dowex 50W x 8, 20–50. Of course, other resins as well as resins having sizes ranging other than 20–50, say 16–100, can be used and are commercially available under the trade names such as Amberlite, Permutit Q, etc. The resins have a capacity of approximately 60 g. of iron exchanged per gram of resin. The spent pickle liquor flows downwardly through the loading zone of the resin which is 6 feet in diameter and 10 feet high. The resin is in hydrogen form after having been regenerated from previous use in stripping zone which is also 6 feet in diameter and 10 feet high. To treat the spent pickle liquor approximately 1300 cu. ft. of resin are employed and the resin is shifted in the column at a rate of about 15.4 cu. ft. per minute.

The regenerated spent liquor in the loading section is removed therefrom at a rate of about 71,000 gallons per day and the resin therein is moved to the stripping section in predetermined periods of time, generally in pulses lasting for about 10–20 seconds, said pulses being actuated, for instance, about every two minutes. The pulses are imposed by the introduction of water to the column. Rinse water is supplied adjacent each of the loading and stripping sections of the column at a rate of about 115 gallons per minute.

Regenerating agent, about 20 percent nitric acid, is introduced to the stripping section 20 of the column at a rate of 1025 lb. mol/hr. The column, preferably, is constructed of mild steel with a plastic lining or type 316 stainless steel. The sections of the column may be belled to 12″ diameter butterfly valves and 12″ elbows. Stainless steel pumps can be used for the iron nitrate solution while a bronze turbine pump can be employed for the resin pulsing.

Iron nitrate and nitric acid are withdrawn from the stripping section 20 of column 16 at a rate of 2,330 gal./hr. and are fed to a titanium hydrolyzer to which is supplied air at a rate of 260 cu. ft./min. at 72° F. and 1 atmosphere pressure. The hydrolyzer is maintained at a temperature of about 400° F. and a pressure of 235 p.s.i.g. From the hydrolyzer there is removed 2347 gallons per hour of a reaction product comprising 68.4 lb. mol/hr. $HNO_3$, 922.8 lb. mol/hr. $H_2O$ and 17.1 lb. mol/hr. $Fe_2O_3$ which is conducted to a separating means to produce 23 tons/day $Fe_2O_3$ in 64 gal./hr. of $H_2O$.

As an alternative to the above-described embodiment the pickling procedures can be carried out using 20–30 percent sulfuric acid in the pickling bath solution. Generally, it has been found that, advantageously, a spent pickle liquor containing up to about 15 percent excess or free sulfuric acid can be efficiently regenerated according to the instant invention. Higher amounts of free sulfuric acid can be present in the spent pickle liquor although the higher concentrations result in adsorption of iron on the resin in reduced amounts.

As another embodiment of the instant invention, sulfamic acid alone or in combination with nitric acid can be used to regenerate the metal ion loaded resin in the stripping section. When as low as 0.15 N sulfamic acid is added to 4 M $NHO_3$ the iron in the iron nitrate was held to a low valency state such as in ferrous nitrate. Such results are advantageous in that it overcomes any gassing phenomenon which can occur within the column due to the oxidation of ferrous nitrate to ferric nitrate in the presence of excess nitric acid introduced into the column.

When sulfamic acid alone is used to strip the resin of iron values in situations where the pickle bath solution was made up from an acid such as sulfuric or hydrochloric, effective regeneration of the resin and recovery of the sulfamic acid can be achieved according to the process of the instant invention.

As another embodiment of the instant invention, and referring to FIGURE 7, the pickle bath solution can be provided containing about 20% $H_2SO_4$ as the pickling agent with or without conventional inhibitors. Employing such a pickling bath the instant invention is suitable for processing 100,000 gallons per day of spent pickle liquor having a composition of 8.5 percent $H_2SO_4$ and 13 percent $FeSO_4$ to produce 32.9 tons per day $Fe_2O_3$ and 49,500 gallons per day of 32% $HNO_3$ resin regenerating agent.

Referring to FIGURE 7, 100,000 gallons per day of spent pickle liquor are removed from pickling tank 10 and introduced into the continuous ion exchange column loop 16 filled with 1300 cu. ft. of cation exchange resin which is shifted in the column at a rate of about 15.4 cu. ft. per minute. The regenerated spent liquor in the loading section is removed therefrom at a rate of about 100,000 gallons per day and the resin therein is moved to the stripping section in predetermined periods of time, generally in pulses lasting for about 10–20 seconds, said pulses being actuated, for instance, about every two minutes. Rinse water is supplied at a rate of about 115 gallons per minute as described hereinbefore.

Regenerating agent, about 32% $HNO_3$ (6 M, sp. gr. 1.19) is introduced to the stripping section 20 of the column at a rate of about 49,500 gallons per day. The column is constructed as described above. Iron nitrate and nitric acid are withdrawn from the stripping section at a rate of about 49,500 gallons per day and are fed to the fluidized bed reactor 118 maintained at a temperature of about 750° F. with a B.t.u. input of about $40.5 \times 10^6$ B.t.u./hr. Air is supplied to the reactor in amounts sufficient to fluidize the particles and the amount can be about 1500 cu. ft./min. The air can be preheated with natural gas, consumed at a rate of about 7.5 cu. ft. per min. The vapors leaving the fluidized bed are conducted to the scrub tower 142 where it is contacted, countercurrently with water entering via conduit 144. About 49,500 gallons per day 32% $HNO_3$ are withdrawn from the tower via line 148 and recycled to the ion exchange column. Make-up $HNO_3$ at a rate of about 7950 lbs./day 100% $HNO_3$ can be supplied to make-up tank 150 if required.

It will be understood from the foregoing description that this invention is not limited to practice according to the specific embodiments illustrated and described herein, and that variations thereof can be made while not departing from the principles involved. This invention is, therefore, to be understood to be limited only by the spirit and scope of the following claims.

What is claimed is:
1. A continuous cyclic process for the pickling of metal, for regenerating spent pickle liquor and for regenerating an agent employed to regenerate said spent pickle liquor which comprises:
   (1) conducting the pickling operation with a pickle liquor having an acid concentration maintained within the range of about 5 to 20 weight percent and a metal salt of said acid concentration maintained within the range of about 1 to 10 weight percent,
   (2) continuously withdrawing spent pickle liquor from the pickling step for regeneration, said regeneration comprising
   (3) flowing said spent pickle liquor through a first section of an ion exchange column loop having a shiftable ion exchange resin bed therein, to bring the same into contact with a first portion of ion exchange resin therein and exchanging metal ions from the spent pickle liquor for ions of the exchange resin; while
   (4) withdrawing from said first section regenerated pickle liquor adapted for continuous recirculation to said pickling step;
   (5) continuously recirculating said regenerated pickle liquor to said pickling step;
   (6) simultaneously treating a second portion of said ion exchange resin loaded with metal ions from (3) with a regenerating agent in a second section of said column loop;
   (7) substantially simultaneously interrupting the flow of said spent pickle liquor and said regenerating agent;
   (8) shifting the ion exchange resin bed in said ion exchange column loop from one section thereof to another contiguous section therein; thereby replacing at least a portion of said resin in said first section with another portion of said resin previously regenerated in said second section and displacing a portion of resin carrying the metal ions previously eliminated from the spent pickle liquor into said second section for regeneration thereof;
   (9) withdrawing from said second section a solution of metal salt of regenerating agent;
   (10) hydrolyzing said solution to provide a mixture of metal oxide and regenerating agent;
   (11) separating said metal oxide from said regenerating agent;
   (12) continuously recycling the regenerated regenerating agent to said second section of said column loop, and
   (13) repeating the same cycle or steps 1–12 as long as desired.

2. The process of claim 1 wherein the pickle liquor acid has pKa ranging from $10^{-4}$ to 1.

3. The process of claim 1 wherein the acid concentration of the pickle liquor is maintained within the range of about 10 to 20 weight percent and the concentration of the metal salt of said acid is maintained within the range of about 1 to 10 weight percent.

4. The process of claim 1 where the ion exchange resin is a cation exchange resin.

5. The process of claim 1 wherein the hydrolyzer is maintained at a pressure of 200 to 300 p.s.i.g. and at a temperature of 350 to 500° F.

6. A continuous cyclic process for regenerating spent pickle liquor and for regenerating an agent employed to regenerate said spent pickle liquor which comprises:
   (1) continuously withdrawing spent pickle liquor from a prior pickling step,
   (2) flowing said spent pickle liquor through a first section of a cation exchange column loop having a shiftable cation exchange resin bed therein, to bring the same into contact with a first portion of the cation exchange resin therein and exchanging the metal ions from the spent pickle liquor for hydrogen ions of the exchange resin; while
   (3) simultaneously treating a second portion of said cation exchange resin loaded with metal ions from (2) with a regenerating agent in a second section of said column loop;
   (4) substantially simultaneously interrupting the flow of said spent pickle liquor and said regenerating agent;
   (5) shifting the cation exchange resin bed in said cation exchange column loop from one section thereof to another contiguous section therein; thereby replacing at least a portion of said resin in said first section with another portion of said resin previously regenerated in said second section and displacing a portion of resin carrying the metal ions previously eliminated from the spent pickle liquor into said second section for regeneration thereof;
   (6) withdrawing metal salt solution of the regenerating agent from said second section;
   (7) hydrolyzing said solution to provide a mixture of metal oxide and regenerating agent;

(8) continuously recycling the regenerated regenerating agent to said second section of said column loop; and
(9) repeating the same cycle of steps 1–8 as long as desired.

7. A continuous cyclic process for the pickling of metal, for regenerating spent pickle liquor and for regenerating an agent employed to regenerate said pickle liquor which comprises:
  (1) conducting the pickling operation with a pickle liquor having an acid concentration maintained within the range of of about 5 to 20 weight percent and a metal salt of said acid concentration maintained with the range of about 1 to 10 percent,
  (2) continuously withdrawing spent pickle liquor from the pickling step for regeneration, said regeneration comprising
  (3) flowing said spent pickle liquor through a first section of an ion exchange column loop having a shiftable ion exchange bed therein, to bring the same into contact with a first portion of ion exchange resin therein and exchanging metal ions from the spent pickle liquor for ions of the exchange resin; while
  (4) withdrawing from said first section regenerated pickle liquid adapted for continuous recirculation to said pickling step;
  (5) continuously recirculating said regenerated pickle liquor to said pickling step;
  (6) simultaneously treating a second portion of said ion exchange resin loaded with metal ions from (3) with a regenerating agent in a second section of said column loop;
  (7) substantially simultaneously interrupting the flow of said spent pickle liquor and said regenerating agent;
  (8) shifting the ion exchange resin bed in said ion exchange column loop from one section thereof to another contiguous section therein; thereby replacing at least a portion of said resin in said first section with another portion of said resin previously regenerated in said second section and displacing a portion of resin carrying the metal ions previously eliminated from the spent pickle liquor into said second section for regeneration thereof;
  (9) withdrawing from said second section a solution of metal salt of regenerating agent;
  (10) contacting said withdrawn metal salt solution with a finely divided solid in a fluidized bed zone to decompose said salt solution to a metal oxide and a gaseous product;
  (11) withdrawing said metal oxide from said fluidized bed zone;
  (12) treating said gaseous product to produce said regenerating agent;
  (13) continuously recycling the regenerating agent from (12) to said second section of said column loop, and
  (14) repeating the same cycle of steps 1–13 as long as desired.

References Cited

UNITED STATES PATENTS

| | | | |
|---|---|---|---|
| 2,185,095 | 12/1939 | Smith et al. | |
| 2,643,204 | 6/1953 | Mancke | 134—13 |
| 2,709,143 | 5/1955 | Francis et al. | 134—15 XR |
| 2,815,322 | 12/1957 | Higgins | 134—25 XR |
| 3,056,743 | 10/1962 | Eichhorn et al. | 210—33 |
| 3,310,435 | 3/1967 | Robinson et al. | 134—3 |
| 3,325,011 | 6/1967 | Keller | 210—189 XR |

FOREIGN PATENTS

| | | |
|---|---|---|
| 570,338 | 2/1959 | Canada. |

OTHER REFERENCES

Regeneration of Acid From Spent Pickle Liquor, I and EC Trends, I and EC, vol. 57, No. 9, September 1965 (p. 11).

JOSEPH SCOVRONEK, Primary Examiner

U.S. Cl. X.R.

134—13, 15, 41; 210—33